(12) United States Patent
Toda (10) Patent No.: US 8,492,957 B2
(45) Date of Patent: Jul. 23, 2013

(54) APPARATUS FOR GENERATING ELECTRIC ENERGY

(76) Inventor: Kohji Toda, Yokosuka (JP)

( * ) Notice: Subject to any disclaimer, the term of this patent is extended or adjusted under 35 U.S.C. 154(b) by 609 days.

(21) Appl. No.: 12/729,266

(22) Filed: Mar. 23, 2010

(65) Prior Publication Data
US 2011/0234048 A1    Sep. 29, 2011

(51) Int. Cl.
*H02N 2/18* (2006.01)
(52) U.S. Cl.
USPC ........... 310/339; 181/158; 381/190; 381/173; 381/174; 310/321; 310/322; 310/324
(58) Field of Classification Search
USPC .................. 310/321, 322, 324, 339; 381/190, 381/173–174; 181/158
See application file for complete search history.

(56) References Cited

U.S. PATENT DOCUMENTS

| 7,116,036 | B2 * | 10/2006 | Balasubramaniam et al. | 310/322 |
| 7,446,459 | B2 * | 11/2008 | Xu et al. | 310/339 |
| 7,466,064 | B2 * | 12/2008 | Sugiura et al. | 310/324 |

OTHER PUBLICATIONS

X. Wang et al., Science, vol. 316, pp. 102-105, 2007.

\* cited by examiner

*Primary Examiner* — J. San Martin

(57) ABSTRACT

An apparatus for generating electric energy comprises a vibration plate, a supporting board, at least one side-wall unit and at least one piezoelectric substrate having a first- and a second end surfaces covered with a first- and a second electrodes, respectively. They all together form at least one cavity resonator. If a sound pressure from the outside arrives at the vibration plate, an acoustic vibration is excited in the vibration plate, and thereby a resonance vibration is induced in the cavity resonator. In this time, the piezoelectric substrate responds collectively to the resonance vibration. Thus, a resonance energy occurred in the cavity resonator is converted into an electric energy, which is delivered through the first- and second electrodes.

19 Claims, 12 Drawing Sheets

FIG. 3 fixed zone

APPARATUS FOR GENERATING ELECTRIC ENERGY

BACKGROUND OF THE INVENTION

The present invention relates to an apparatus for generating electric energy by means of using at least one cavity resonator composed of a vibration plate, at least one side-wall unit, a supporting board and at least one piezoelectric substrate.

An energy conversion technique from mechanical vibration to electric power is hopeful as one of the techniques for recovering energy to charge. For example, batteries in a sensor system used in a wide range of applications are requested to have a compact and efficient power supply. The energy conversion technique is mainly based upon a piezoelectric effect, a magnetic induction effect or an electrostatic capacitance effect. Thus, a device having almost the same construction as a microphone is conveniently utilized. One of the most popular devices is a floor type, which has piezoelectric substrates mounted on a vibrating board and generates electric power from mechanical vibration by receiving a pressure on the floor. Recently, an energy conversion device with ZnO wires on the nanometer scale, of which each has a piezoelectricity and can be multi-directionally bended in accordance with mechanical vibration of electrode, has been presented (X. Wang et al., Science, vol. 316, pp. 102-105, 2007). However, there exist still many problems in efficiency of the energy conversion, because these conventional techniques make use of nothing but dimensional change of piezoelectric material accompanied by mechanical vibration. In other words, conventional techniques pass over a resonance vibration phenomenon in piezoelectric materials.

BRIEF SUMMARY OF THE INVENTION

An object of the present invention is to provide an apparatus for generating electric energy making use of a resonance vibration phenomenon in a piezoelectric substrate.

Another object of the present invention is to provide an apparatus for generating electric energy capable of detecting a sound pressure from the outside, and converting a resonance energy derived from the sound pressure into an electric energy.

Another object of the present invention is to provide an apparatus for generating electric energy capable of detecting a mechanical shock from the outside, and converting a resonance energy derived from the mechanical shock into an electric energy.

Another object of the present invention is to provide an apparatus for generating electric energy capable of a highly-efficient conversion from a resonance energy into an electric energy.

Another object of the present invention is to provide an apparatus for generating electric energy able to be used as a sensor responding to a sound or a mechanical shock.

Another object of the present invention is to provide an apparatus for generating electric energy able to be used as a power supply, that is at least an auxiliary one.

Another object of the present invention is to provide an apparatus for generating electric energy having a simple structure which is very light in weight.

Another object of the present invention is to provide an apparatus for generating electric energy suitable for saving in setting space.

Another object of the present invention is to provide an apparatus for generating electric energy easily scaled up as well as down, because of a unit structure thereof.

A still other object of the present invention is to provide an apparatus for generating electric energy easily set up anywhere.

A still further object of the present invention is to provide an apparatus for generating electric energy excellent in durability and manufacturing.

According to one aspect of the present invention there is provided an apparatus for generating electric energy comprising a vibration plate, a supporting board, one side-wall unit and at least one piezoelectric substrate having a first- and a second end surfaces covered with a first- and a second electrodes, respectively. The vibration plate, the supporting board, and the side-wall unit make one sealed cavity, in which the piezoelectric substrate exists in a way that at least one surface-spot of the piezoelectric substrate is bonded to the supporting board via at least one adhesive mass. Thus, the piezoelectric substrate and the sealed cavity form one cavity resonator. When a sound pressure from the outside arrives at the vibration plate, an acoustic vibration is excited in the vibration plate, and thereby a resonance vibration is induced in the cavity resonator. In this time, the piezoelectric substrate responds collectively to the resonance vibration. Consequently, a resonance energy occurred in the cavity resonator is converted into an electric energy, which is delivered through the first- and second electrodes.

According to another aspect of the present invention there is provided an apparatus for generating electric energy having not one but at least two side-wall units making at least two sealed cavities, respectively. In this time, the sealed cavities have the vibration plate and the supporting board in common. Each of the sealed cavities involves at least one piezoelectric substrate and forms the cavity resonator together with the piezoelectric substrate. Thus, the apparatus has the unit structure enabling a scale up as well as down thereof.

According to another aspect of the present invention there is provided an apparatus for generating electric energy, wherein the electric energy delivered through the first- and second electrodes has the same frequency as a resonance frequency in the cavity resonator, and the resonance frequency is almost equivalent to a resonance frequency in the piezoelectric substrate.

According to another aspect of the present invention there is provided an apparatus for generating electric energy, wherein a distance between the vibration plate and the piezoelectric substrate is dependent on the resonance frequency in the cavity resonator.

According to another aspect of the present invention there is provided an apparatus for generating electric energy, wherein a resonance condition of the piezoelectric substrate is dependent on the position of the surface-spot of the piezoelectric substrate.

According to another aspect of the present invention there is provided at least one piezoelectric substrate that has at least one zone corresponding to at least one vibration node of a resonance vibration in the piezoelectric substrate. In this time, the surface-spot of the piezoelectric substrate is present within the zone.

According to another aspect of the present invention there is provided a vibration plate having almost the same acoustic impedance as the piezoelectric substrate.

According to another aspect of the present invention there is provided at least one piezoelectric substrate made of a piezoelectric ceramic with rectangular pillar-shape, of which the polarization axis is parallel to the thickness direction thereof. Then, it is possible for the piezoelectric substrate to operate in a contour mode of resonance vibration, in addition, for each of the first- and second electrodes of the piezoelectric substrate to be electrically divided into four square parts.

According to another aspect of the present invention there is provided at least one piezoelectric substrate made of a piezoelectric ceramic with square plate-shape, of which the polarization axis is parallel to the thickness direction thereof. Then, it is possible for each of the first- and second electrodes of the piezoelectric substrate to be electrically divided into four square parts with electrode terminals, respectively, of which the polarities control the resonance frequency of the piezoelectric substrate.

According to another aspect of the present invention there is provided at least one piezoelectric substrate made of a piezoelectric ceramic with disk shape, of which the polarization axis is parallel to the thickness direction thereof. Then, it is possible for each of the first- and second electrodes of the piezoelectric substrate to be electrically divided into four quarter-round parts with electrode terminals, respectively, of which the polarities control the resonance frequency of the piezoelectric substrate.

According to another aspect of the present invention there is provided at least one piezoelectric substrate made of a piezoelectric ceramic with annular plate-shape, of which the polarization axis is parallel to the thickness direction thereof. Then, it is possible for each of the first- and second electrodes of the piezoelectric substrate to be electrically divided into four quarter-sector parts with electrode terminals, respectively, of which the polarities control the resonance frequency of the piezoelectric substrate.

According to another aspect of the present invention there is provided at least one piezoelectric substrate made of a piezoelectric polymer film.

According to a still other aspect of the present invention there is provided a supporting board having at least one projecting part, to which the surface-spot of the piezoelectric substrate is bonded.

According to a still further aspect of the present invention there is provided a vibration plate for not catching a sound pressure from the outside but receiving an external mechanical shock on the outside surface of the vibration plate.

BRIEF DESCRIPTION OF THE SEVERAL VIEWS OF THE DRAWINGS

Other features and advantages of the invention will be also clarified from the following description with reference to the attached drawings.

DETAILED DESCRIPTION OF THE INVENTION

Figure 1:
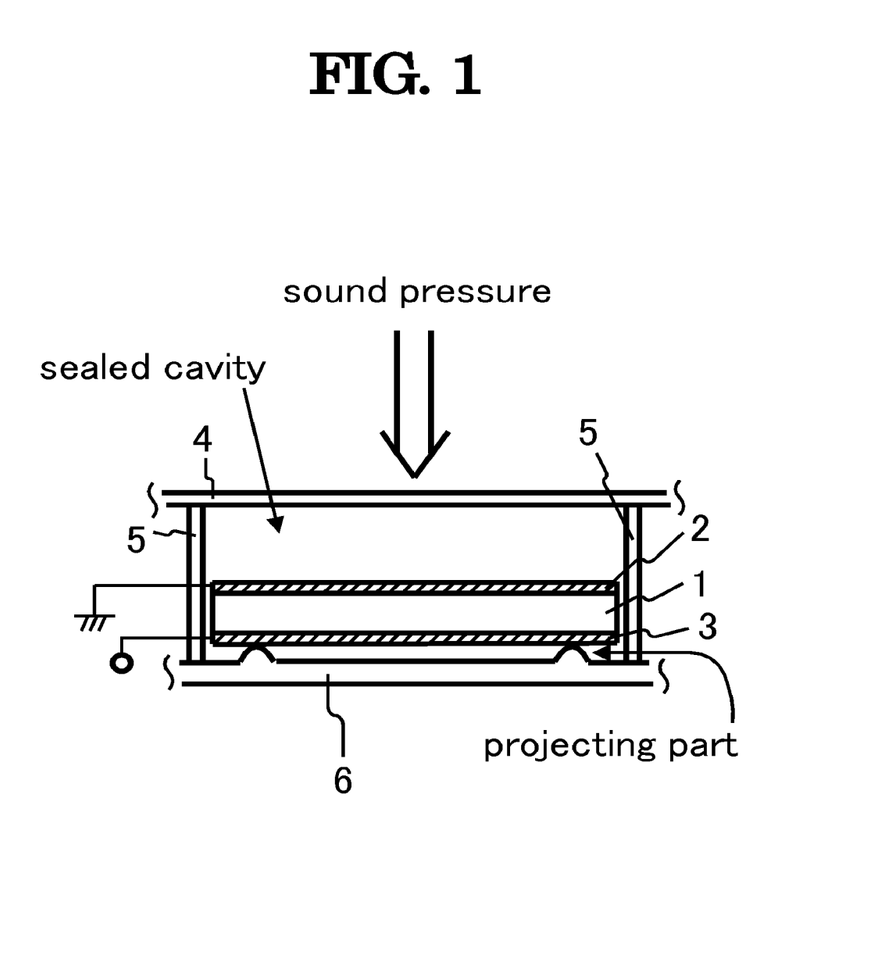
FIG. 1 shows a fragmental sectional view of an apparatus for generating electric energy according to a first embodiment of the present invention.

FIG. 1 shows a fragmental sectional view of an apparatus for generating electric energy according to a first embodiment of the present invention. The apparatus for generating electric energy comprises piezoelectric substrate 1, electrode 2, electrode 3, vibration plate 4, side-wall unit 5 and supporting board 6. Piezoelectric substrate 1, having a rectangular pillar-shape, is made of a piezoelectric ceramic with dimensions of 0.24 mm in thickness (T), 40.1 mm in length (L), and 7.5 mm in width (W), and has two end surfaces vertical to the thickness direction thereof, the polarization axis thereof being parallel to the thickness direction thereof. In this time, it is possible to use a piezoelectric polymer film as piezoelectric substrate 1. Electrodes 2 and 3, made of aluminum thin films, are formed on two end surfaces of piezoelectric substrate 1, respectively. Vibration plate 4 has almost the same acoustic impedance as piezoelectric substrate 1. Supporting board 6 has two projecting parts. Thus, vibration plate 4, side-wall unit 5 and supporting board 6 are combined with each other, and make a sealed cavity, in which piezoelectric substrate 1 exists in such a way as to be fixed to the projecting parts of supporting board 6 through electrode 3. In this way, vibration plate 4, side-wall unit 5, supporting board 6 and piezoelectric substrate 1 form a cavity resonator having a small size which is very light in weight and has a simple structure.

Figure 2:
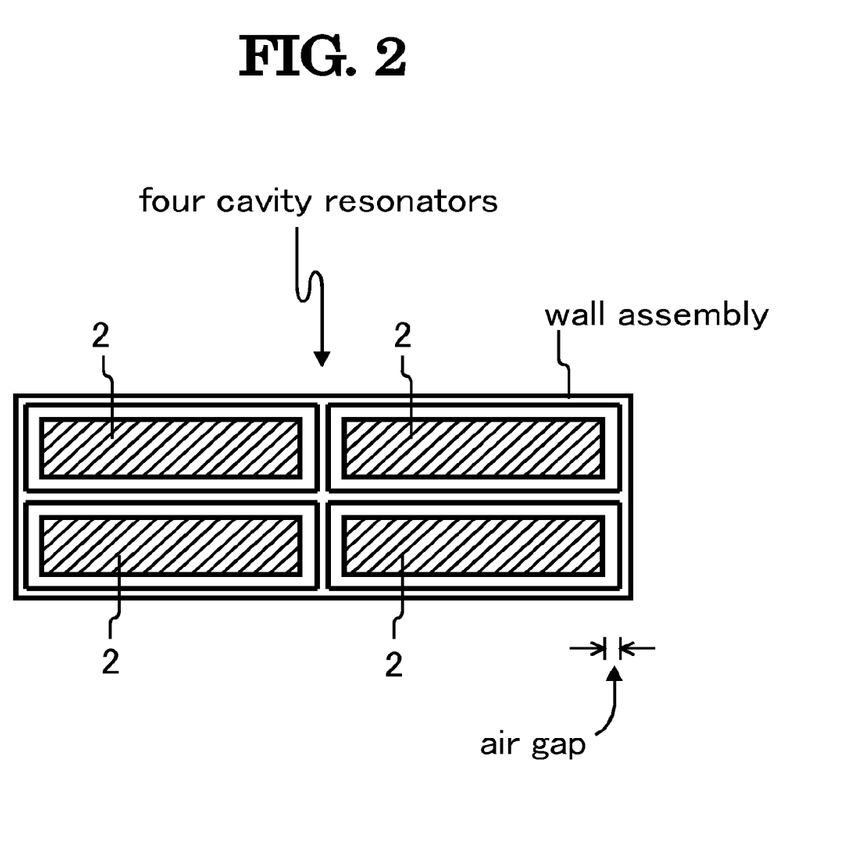
FIG. 2 shows a top plan view of the apparatus for generating electric energy in FIG. 1 without vibration plate 4.

FIG. 2 shows a top plan view of the apparatus for generating electric energy in FIG. 1 without vibration plate 4. The cavity resonator can be used not only singularly but also collectively. In case of the collective usage, for example, four cavity resonators can be laid out not only separately but also closely as FIG. 2. It is noticed that all the side-wall units 5 share vibration plate 4 and supporting board 6, and two adjacent side-wall units 5 share one side-wall between them. As a result, all the side-wall units 5 form a wall assembly. In addition, it is desired that piezoelectric substrate 1 is not cemented to each side-wall unit 5, but situated to make a narrow air gap between piezoelectric substrate 1 and each side-wall unit 5. Thus, the introduction of a group of the cavity resonators with Interconnecting arrangements, as FIG. 2, is suitable for saving in setting space of the apparatus, in other words, suitable for enlarging the scale of the apparatus.

Figure 3:
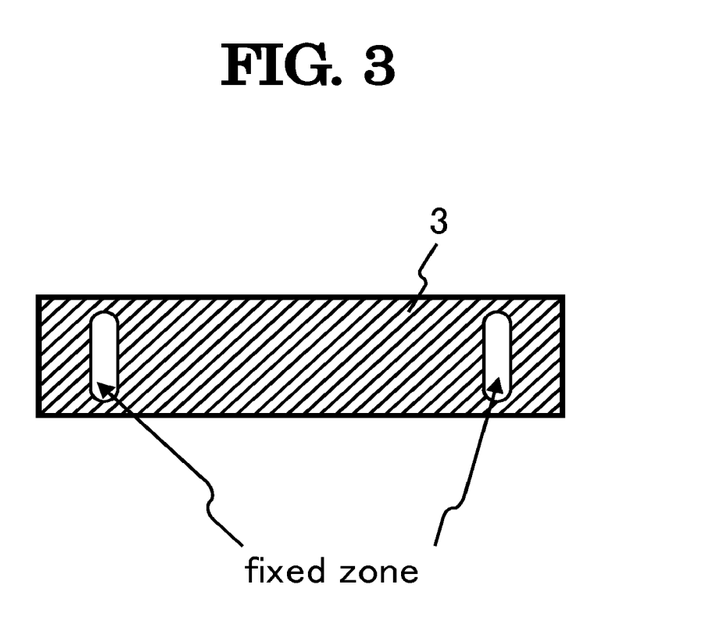
FIG. 3 shows a bottom plan view of piezoelectric substrate 1 in FIG. 1.

FIG. 3 shows a bottom plan view of piezoelectric substrate 1 in FIG. 1. Piezoelectric substrate 1 has three resonance frequencies corresponding to thickness (T), length (L), and width (W), respectively. A sharp resonance condition is recognized at around 40 kHz. In addition, at 40 kHz, the vibration displacement of the resonance vibration in piezoelectric substrate 1 is the smallest at two zones in piezoelectric substrate 1, in other words, there exist two vibration nodes corresponding to the two zones. Because the resonance vibration in piezoelectric substrate 1 is not disturbed, piezoelectric substrate 1 is supported at two surface-spots within the two zones, respectively, which are shown as two fixed zones in FIG. 3. In this way, the resonance condition of piezoelectric substrate 1 is dependent on the positions of the surface-spots of piezoelectric substrate 1.

Figure 4:
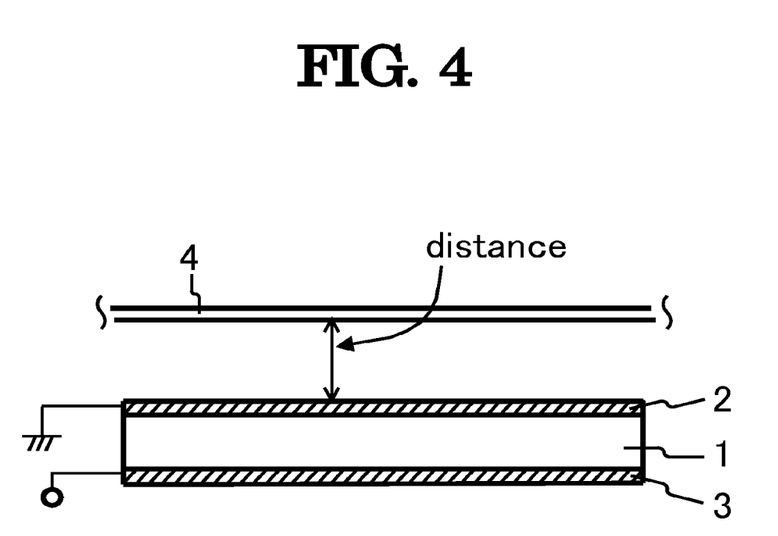
FIG. 4 shows another fragmentary sectional view of the apparatus for generating electric energy in FIG. 1.

FIG. 4 shows another fragmentary sectional view of the apparatus for generating electric energy in FIG. 1. Side-wall unit 5 and supporting board 6 are not drawn in FIG. 4. It is noted that a distance between vibration plate 4 and piezoelectric substrate 1 is dependent on a resonance frequency in the cavity resonator, and thus, the distance is calculated to 4.25 mm from the equation, f=v/2t (f=resonance frequency, v=sound velocity in air, t=distance), when the resonance frequency in the cavity resonator is 40 kHz.

Figure 5:
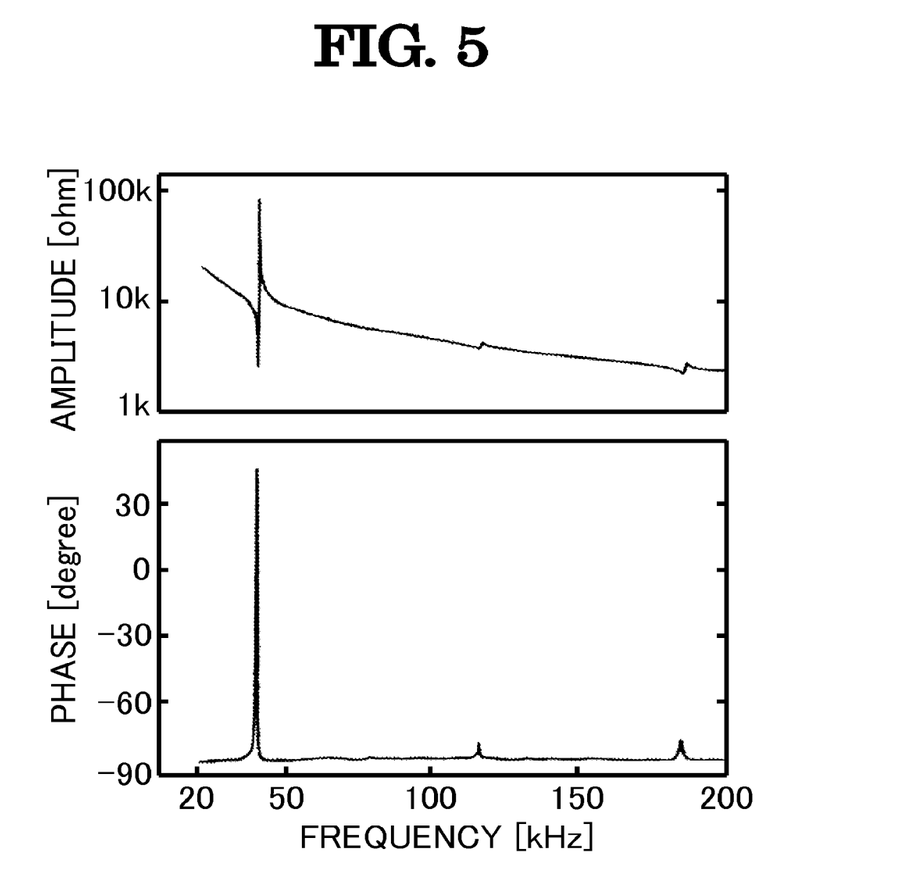
FIG. 5 shows the frequency dependences of the phase and amplitude of the impedance between electrodes 2 and 3 in piezoelectric substrate 1 alone.

FIG. 5 shows the frequency dependences of the phase and amplitude of the impedance between electrodes 2 and 3 in piezoelectric substrate 1 alone. The distinguished change of the impedance, corresponding to the resonance behavior, is observed at around 40 kHz, where piezoelectric substrate 1 can most easily satisfy a resonant vibration condition.

In the apparatus for generating electric energy in FIG. 1, if a sound pressure arrives at vibration plate 4 from the outside, vibration plate 4 catches the sound pressure, and causes an acoustic vibration in its own, and then makes a resonance vibration in the cavity resonator. Piezoelectric substrate 1 responds collectively to the resonance vibration induced in the cavity resonator, and delivers, through electrodes 2 and 3, a resonance energy occurred in the cavity resonator as an electric energy. In this way, the resonance vibration is induced in the cavity resonator when the acoustic vibration has the same frequency as a resonance frequency in the cavity resonator, ultimately a resonance frequency in piezoelectric substrate 1. In this time, the most desirable construction for the effective resonance vibration is as follows: (1) piezoelectric substrate 1 exists in the sealed cavity as shown in FIG. 1, (2) there exists a narrow air gap between piezoelectric substrate 1 and each side-wall unit 5 as shown in FIG. 2, (3) piezoelectric substrate 1 is supported by supporting board 6 at two surface-spots within the two fixed zones, respectively, as shown in FIGS. 3, and (4) a distance between vibration plate 4 and piezoelectric substrate 1, as shown in FIG. 4, is decided according to the resonance frequency in the cavity resonator. Such the construction makes piezoelectric substrate 1 operate in a contour mode of resonance vibration. The contour mode means a vibration mode in not thickness (T) direction but plane direction perpendicular to thickness (T) direction of piezoelectric substrate 1. Thus, piezoelectric substrate 1 enables to deliver, through electrodes 2 and 3, a resonance energy occurred in the cavity resonator as an electric energy with the same frequency as the resonance frequency in the cavity resonator, ultimately the resonance frequency in piezoelectric substrate 1. For example, if vibration plate 4 catches a sound pressure and is acoustically vibrated at 40 kHz, a resonance vibration with a resonance frequency of 40 kHz is induced in the cavity resonator. Consequently, a resonance energy occurred in the cavity resonator is delivered from piezoelectric substrate 1 as an electric energy with a frequency of 40 kHz through electrodes 2 and 3.

Figure 6:
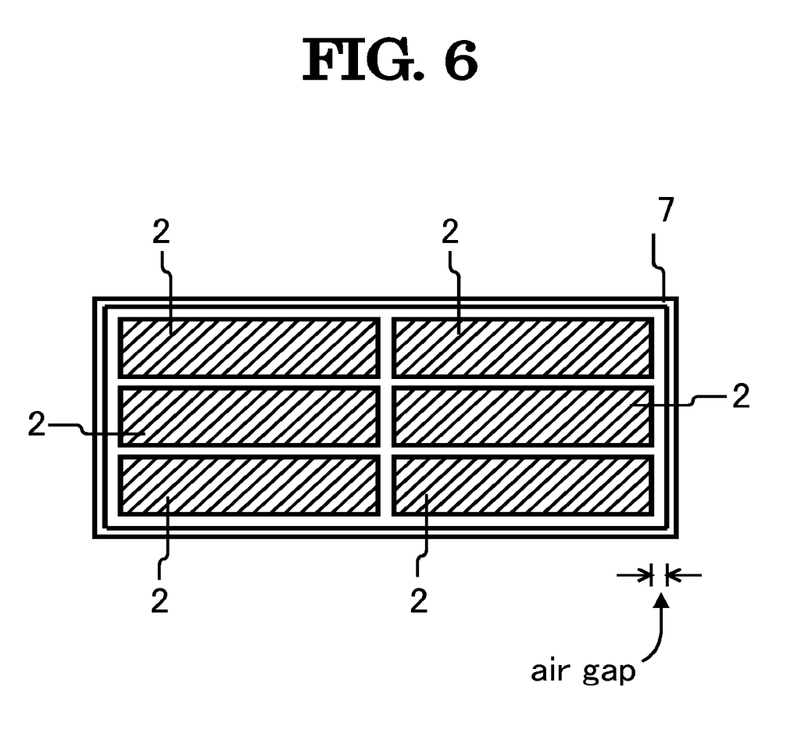
FIG. 6 shows a top plan view of the apparatus for generating electric energy according to a second embodiment of the present invention.

FIG. 6 shows a top plan view of the apparatus for generating electric energy according to a second embodiment of the present invention. The apparatus for generating electric energy has the same construction as FIG. 1 except for using not one but six piezoelectric substrates 1 involved in side-wall unit 7 that is in place of side-wall unit 5. Thus, FIG. 6 shows only side-wall unit 7 and six piezoelectric substrates 1 covered with electrodes. Vibration plate 4, side-wall unit 7, supporting board 6 and six piezoelectric substrates 1 form one cavity resonator as FIG. 6. It is desired that all the piezoelectric substrates 1 are laid out separately, and are not cemented to side-wall unit 7, but situated to make a narrow air gap between each piezoelectric substrate 1 and side-wall unit 7. The cavity resonator in FIG. 6 can be used not only singularly but also collectively.

The apparatus for generating electric energy in FIG. 6 is substantially equivalent in function to the apparatus in FIG. 1. The introduction of a collectivity with interconnecting arrangements of the cavity resonators enables a saving in setting space of the apparatus, and consequently, enables an enlargement of the scale of the apparatus.

Figure 7:
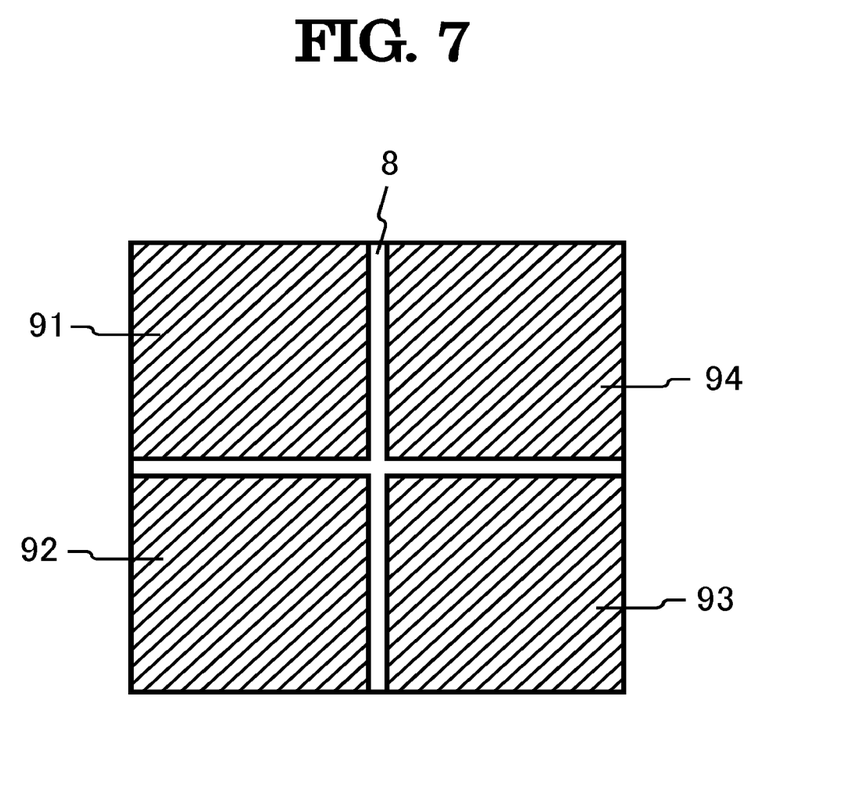
FIG. 7 shows a top plan view of the apparatus for generating electric energy according to a third embodiment of the present invention.

FIG. 7 shows a top plan view of the apparatus for generating electric energy according to a third embodiment of the present invention. The apparatus for generating electric energy has the same construction as FIG. 1 except for using piezoelectric substrate 8 in place of piezoelectric substrate 1, and supporting board 6 without projecting parts. FIG. 7 shows only piezoelectric substrate 8 covered with electrodes. Piezoelectric substrate 8 has a square plate-shape with dimensions of 0.23 mm in thickness (T) and 18.8 mm in both length (L) and width (W), and the polarization axis thereof is parallel to the thickness direction thereof. Piezoelectric substrate 8 has electrodes 9 and 10 in place of electrodes 2 and 3, respectively, and is bonded to supporting board 6 at several surface-spots thereof via several adhesive masses. Electrodes 9 and 10 can be electrically divided into four square parts, respectively. In this way, electrode 9 comprises electrode-parts 91, 92, 93 and 94, and electrode 10, not drawn in FIG. 7, comprises electrode-parts 101, 102, 103 and 104 corresponding to electrode-parts 91, 92, 93 and 94, respectively. Pairs of electrode-parts 91 and 101, 92 and 102, 93 and 103, and 94 and 104, can operate as piezoelectric transducers T1, T2, T3 and T4, respectively, for expansion or contraction in the direction parallel to the electrode surface, that is, vertical to the polarization axis of piezoelectric substrate 8. Thus, three modes, namely the antisymmetrical-antisymmetrical (AA) mode, the antisymmetrical-symmetrical (AS) mode, and the symmetrical-symmetrical (SS) mode, are valid according to the combination of polarization.

Figure 8:
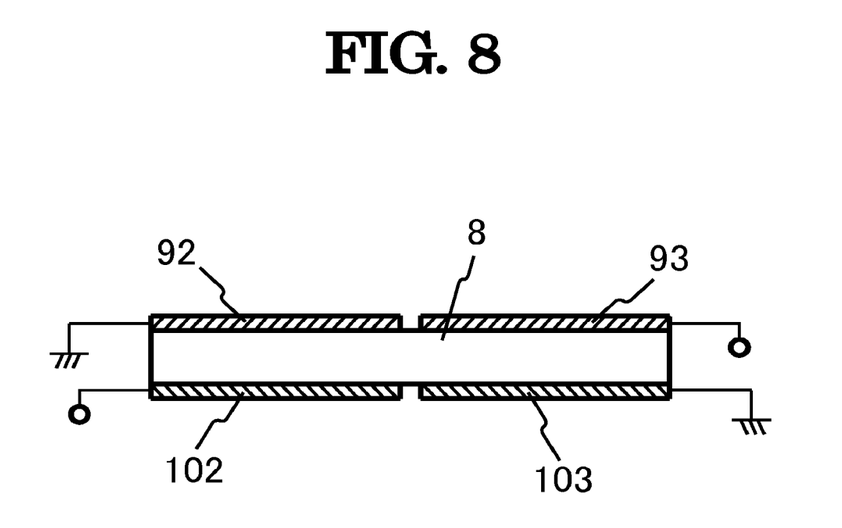
FIG. 8 shows a sectional view of piezoelectric substrate 8 in FIG. 7.

FIG. 8 shows a sectional view of piezoelectric substrate 8 in FIG. 7. Electrode-parts 91, 94, 101 and 104 are not drawn in FIG. 8.

Figure 9:
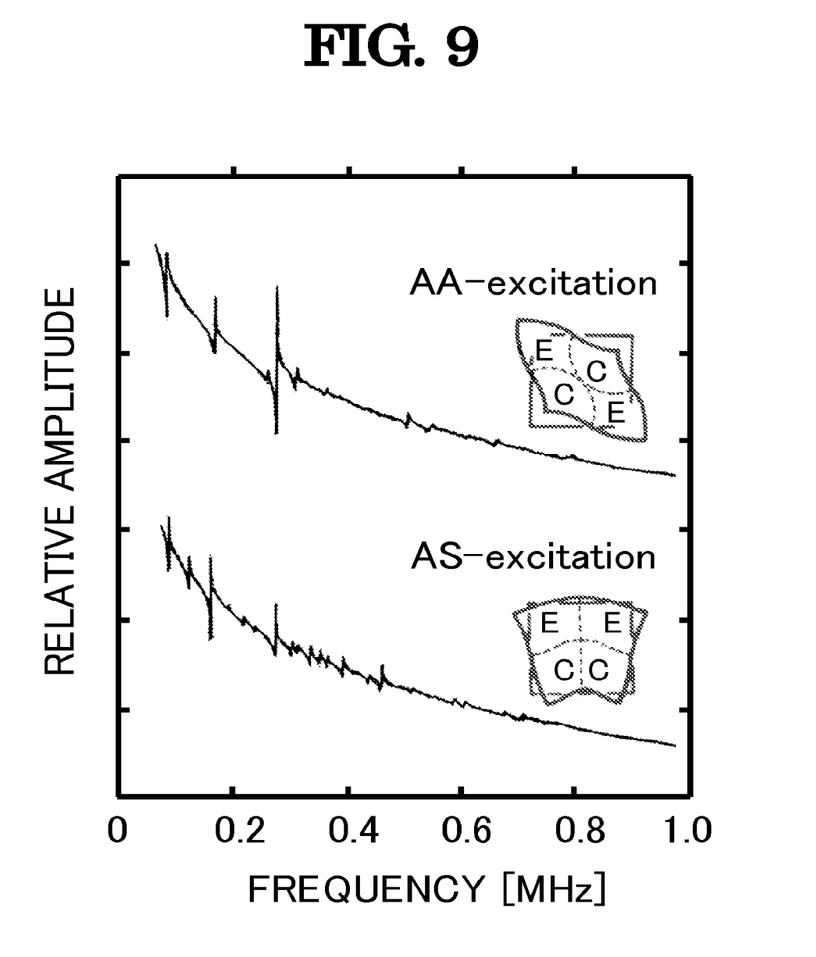
FIG. 9 shows the frequency dependence of the relative amplitude of the impedance at piezoelectric transducers T1~T4 in piezoelectric substrate 8 alone.

FIG. 9 shows the frequency dependence of the relative amplitude of the impedance at piezoelectric transducers T1~T4 in piezoelectric substrate 8 alone. The results were obtained by changing the polarity of the electrode terminal in three ways. When the polarities at piezoelectric transducers T1~T4 are the same, all the piezoelectric transducers T1~T4 simultaneously cause expansion (E) or contraction (C) in all the corners of piezoelectric substrate 8. At this condition, the SS-mode excitation, not drawn in FIG. 9, occurs in piezoelectric substrate 8. On the other hand, the inverse connection order of the electrode terminal, as shown in FIG. 8, results in a contrary manner to that in the same connection order. The introduction of this procedure makes it possible to obtain a resonator with a particular mode, which is a kind of contour mode. For details, when the polarities of the vibrations at piezoelectric transducers T1 and T3 are opposite to those at T2 and T4, only the AA-mode excitation is efficient, and thus, three remarkable resonance points at 65-, 146- and 256 kHz exist. If the polarities of the vibrations at piezoelectric transducers T1 and T4 are opposite to those at T2 and T3, only the AS-mode excitation is efficient, and three remarkable resonance points at 68-, 103- and 140 kHz exist. In this way, the vibration modes affect the resonance frequencies of piezoelectric substrate 8, and are dependent on the connection order of the electrode terminal after the polarity treatment. In a word, the polarities of the electrode terminals control the resonance frequencies of piezoelectric substrate 8.

Figure 10:
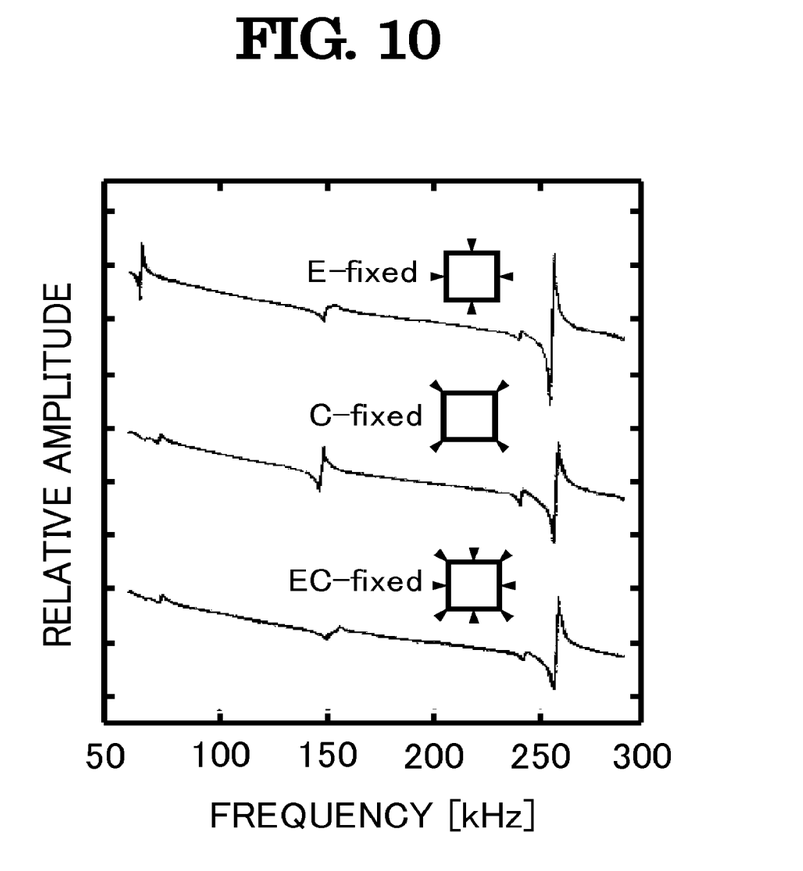
FIG. 10 shows the frequency dependence of the relative amplitude of the impedance at piezoelectric transducers T1~T4 in piezoelectric substrate 8 bonded to supporting board 6 via several adhesive masses.

FIG. 10 shows the frequency dependence of the relative amplitude of the impedance at piezoelectric transducers T1~T4 in piezoelectric substrate 8 bonded to supporting board 6 via several adhesive masses. An effect of supporting the edge of piezoelectric substrate 8 in the AA-mode excitation condition was examined. The results are shown in the form of a comparison, where the first trace is for the support of the four edge centers denoted as E-fixed, the second is for the support of the four corners denoted as C-fixed, and the third is under both the E- and C-fixed conditions denoted as EC-fixed. The 256 kHz resonance was not affected under any support condition, since this vibration displacement is widely distributed inside the substrate. On the other hand, both the 65- and 146 kHz resonances were suppressed under EC-fixed condition. This means that the EC-fixed condition is most effective for emphasizing the 256 kHz resonance and simultaneously suppressing the 65- and 146 kHz resonances as excessive resonances. In short, the resonance condition of piezoelectric substrate 8 is dependent on the positions of the surface-spots of piezoelectric substrate 8.

In the apparatus for generating electric energy in FIG. 7, if vibration plate 4 directly receives an external mechanical shock on the outside surface thereof, vibration plate 4 causes an acoustic vibration in its own, and then makes a resonance vibration in the cavity resonator with piezoelectric substrate 8, which operates in a kind of contour mode of resonance vibration. Piezoelectric substrate 8 responds collectively to the resonance vibration induced in the cavity resonator, and enables to deliver, through piezoelectric transducers T1~T4, a resonance energy occurred in the cavity resonator to an electric energy with the same frequency as a resonance frequency in the cavity resonator, ultimately a resonance frequency in piezoelectric substrate 8. In this time, the resonance frequency of piezoelectric substrate 8 is controlled by the polarities of the electrode terminals as well as the support condition. Therefore, if using piezoelectric substrate 8 under EC-fixed condition and the electrode-terminal connection that the AA-mode excitation occurs, the cavity resonator predominantly behaves as a resonator with the resonance frequency of 256 kHz. At this condition, it should be noted that a distance between vibration plate 4 and piezoelectric substrate 8 is needed to be set to about 0.664 mm, which is calculated from the equation mentioned in the sentence concerning FIG. 4. In a word, when piezoelectric substrate 8 is under EC-fixed condition, and the polarities of the electrode terminals at piezoelectric transducers T1 and T3 are set to be opposite to those at T2 and T4, and besides, the distance between vibration plate 4 and piezoelectric substrate 8 is set to about 0.664 mm, a resonance vibration with a resonance frequency of 256 kHz is effectively induced in the cavity resonator, and a resonance energy occurred in the cavity resonator is delivered from piezoelectric substrate 8 as an electric energy with a frequency of 256 kHz through piezoelectric transducers T1~T4.

Figure 11:
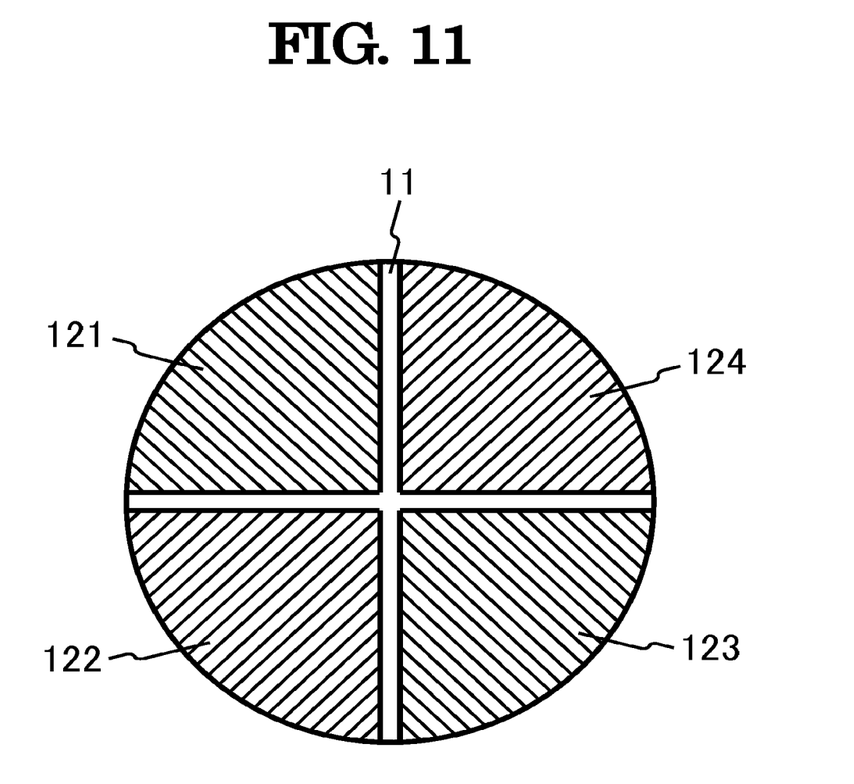
FIG. 11 shows a top plan view of the apparatus for generating electric energy according to a fourth embodiment of the present invention.

FIG. 11 shows a top plan view of the apparatus for generating electric energy according to a fourth embodiment of the present invention. The apparatus for generating electric energy has the same construction as FIG. 1 except for using piezoelectric substrate 11 in place of piezoelectric substrate 1, and supporting board 6 without projecting parts. FIG. 11 shows only piezoelectric substrate 11 covered with electrodes. Piezoelectric substrate 11 has a disk shape with dimensions of 0.20 mm in thickness (T) and 20.0 mm in diameter (D), and the polarization axis thereof is parallel to the thickness direction thereof. Piezoelectric substrate 11 has electrodes 12 and 13 in place of electrodes 2 and 3, respectively, and is bonded to supporting board 6 at several surface-spots thereof via several adhesive masses. Electrodes 12 and 13 can be electrically divided into four quarter-round parts, respectively. In this way, electrode 12 comprises electrode-parts 121, 122, 123 and 124, and electrode 13, not drawn in FIG. 11, comprises electrode-parts 131, 132, 133 and 134. Electrodes 12 and 13 perform the same functions as electrodes 9 and 10 in the apparatus according to the third embodiment.

Figure 12:
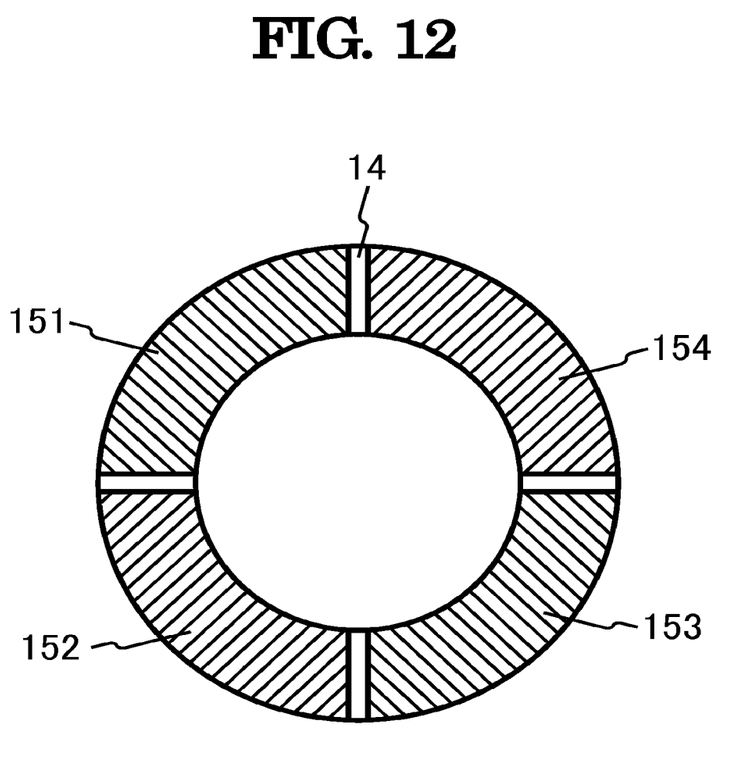
FIG. 12 shows a top plan view of the apparatus for generating electric energy according to a fifth embodiment of the present invention.

FIG. 12 shows a top plan view of the apparatus for generating electric energy according to a fifth embodiment of the present invention. The apparatus for generating electric energy has the same construction as FIG. 1 except for using piezoelectric substrate 14 in place of piezoelectric substrate 1, and supporting board 6 without projecting parts. FIG. 12 shows only piezoelectric substrate 14 covered with electrodes. Piezoelectric substrate 14 has an annular plate-shape with dimensions of 0.20 mm in thickness (T), 21.0 mm in outer diameter (D1), and 14.0 mm in inner diameter (D2), and the polarization axis thereof is parallel to the thickness direction thereof. Piezoelectric substrate 14 has electrodes 15 and 16 in place of electrodes 2 and 3, respectively, and is bonded to supporting board 6 at several surface-spots thereof via several adhesive masses. Electrodes 15 and 16 can be electrically divided into four quarter-sector parts, respectively. In this way, electrode 15 comprises electrode-parts 151, 152, 153 and 154, and electrode 16, not drawn in FIG. 12, comprises electrode-parts 161, 162, 163 and 164. Electrodes 15 and 16 perform the same functions as electrodes 9 and 10 in the apparatus according to the third embodiment.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus for generating electric energy comprising:
 a vibration plate;
 a supporting board;
 one side-wall unit constructed between said vibration plate and said supporting board, and making one sealed cavity together with said vibration plate and said supporting board; and
 at least one piezoelectric substrate existing in said sealed cavity in a way that at least one surface-spot of said at least one piezoelectric substrate is bonded to said supporting board via at least one adhesive mass, and said at least one piezoelectric substrate is not attached to said vibration plate, wherein said at least one piezoelectric substrate has a first- and a second end surfaces that is vertical to the thickness direction thereof and is covered with a first- and a second electrodes, respectively,
 said at least one piezoelectric substrate and said sealed cavity forming one cavity resonator,
 said vibration plate catching a sound pressure from the outside, and causing an acoustic vibration in its own, and then making a resonance vibration in said cavity resonator,
 said at least one piezoelectric substrate responding collectively to said resonance vibration induced in said cavity resonator, and delivering, through said first- and second electrodes, a resonance energy occurred in said cavity resonator as an electric energy.

2. An apparatus for generating electric energy as defined in claim 1, wherein
there exist not one but at least two side-wall units forming a wall assembly constructed between said vibration plate and said supporting board, and making not one but at least two sealed cavities, respectively, together with said vibration plate and said supporting board in such a way that said at least two side-wall units share said vibration plate and said supporting board, and
each of said at least two sealed cavities involves said at least one piezoelectric substrate and forms said cavity resonator together with said at least one piezoelectric substrate.

3. An apparatus for generating electric energy as defined in claim 1, wherein said electric energy has the same frequency as a resonance frequency in said at least one cavity resonator, and said resonance frequency is almost equivalent to a resonance frequency in said at least one piezoelectric substrate.

4. An apparatus for generating electric energy as defined in claim 1, wherein a distance between said vibration plate and said at least one piezoelectric substrate is determined from a resonance frequency in said at least one piezoelectric substrate.

5. An apparatus for generating electric energy as defined in claim 1, wherein said at least one piezoelectric substrate has at least one zone corresponding to at least one vibration node of a resonance vibration in said at least one piezoelectric substrate, and said at least one surface-spot is present within said at least one zone.

6. An apparatus for generating electric energy as defined in claim 1, wherein said vibration plate has almost the same acoustic impedance as said at least one piezoelectric substrate.

7. An apparatus for generating electric energy as defined in claim 1, wherein said at least one piezoelectric substrate is made of a piezoelectric ceramic with rectangular pillar-shape, and the polarization axis thereof is parallel to the thickness direction thereof.

8. An apparatus for generating electric energy as defined in claim 1, wherein said at least one piezoelectric substrate is made of a piezoelectric ceramic with rectangular pillar-shape, and the polarization axis thereof is parallel to the thickness direction thereof, and then, said at least one piezoelectric substrate operates in a contour mode of resonance vibration.

9. An apparatus for generating electric energy as defined in claim 1, wherein said at least one piezoelectric substrate is made of a piezoelectric ceramic with square plate-shape, and the polarization axis thereof is parallel to the thickness direction thereof, and then, each of said first- and second electrodes are electrically divided into four square parts.

10. An apparatus for generating electric energy as defined in claim 1, wherein said at least one piezoelectric substrate is made of a piezoelectric ceramic with square plate-shape, and the polarization axis thereof is parallel to the thickness direction thereof, and then, each of said first- and second electrodes are electrically divided into four square parts with electrode terminals, respectively, of which the polarities control the resonance frequency of said at least one piezoelectric substrate.

11. An apparatus for generating electric energy as defined in claim 1, wherein said at least one piezoelectric substrate is made of a piezoelectric ceramic with disk shape, and the polarization axis thereof is parallel to the thickness direction thereof.

12. An apparatus for generating electric energy as defined in claim 1, wherein said at least one piezoelectric substrate is made of a piezoelectric ceramic with disk shape, and the polarization axis thereof is parallel to the thickness direction thereof, and then, each of said first- and second electrodes are electrically divided into four quarter-round parts.

13. An apparatus for generating electric energy as defined in claim 1, wherein said at least one piezoelectric substrate is made of a piezoelectric ceramic with disk shape, and the polarization axis thereof is parallel to the thickness direction thereof, and then, each of said first- and second electrodes are electrically divided into four quarter-round parts with electrode terminals, respectively, of which the polarities control the resonance frequency of said at least one piezoelectric substrate.

14. An apparatus for generating electric energy as defined in claim 1, wherein said at least one piezoelectric substrate is made of a piezoelectric ceramic with annular plate-shape, and the polarization axis thereof is parallel to the thickness direction thereof.

15. An apparatus for generating electric energy as defined in claim 1, wherein said at least one piezoelectric substrate is made of a piezoelectric ceramic with annular plate-shape, and the polarization axis thereof is parallel to the thickness direction thereof, and then, each of said first- and second electrodes are electrically divided into four quarter-sector parts.

16. An apparatus for generating electric energy as defined in claim 1, wherein said at least one piezoelectric substrate is made of a piezoelectric ceramic with annular plate-shape, and the polarization axis thereof is parallel to the thickness direction thereof, and then, each of said first- and second electrodes are electrically divided into four quarter-sector parts with electrode terminals, respectively, of which the polarities control the resonance frequency of said at least one piezoelectric substrate.

17. An apparatus for generating electric energy as defined in claim 1, wherein said at least one piezoelectric substrate is made of a piezoelectric polymer film.

18. An apparatus for generating electric energy as defined in claim 1, wherein said supporting board has at least one projecting part, and said at least one surface-spot of said at least one piezoelectric substrate is bonded to said at least one projecting part.

19. An apparatus for generating electric energy as defined in claim 1, wherein said at least one vibration plate does not catch a sound pressure from the outside, but directly receives an external mechanical shock on the outside surface thereof.

* * * * *